Nov. 22, 1955     B. D. LEE     2,724,453
METHODS OF IDENTIFYING SEISMIC WAVES
Filed May 4, 1951     5 Sheets-Sheet 1

INVENTOR.
BURTON D. LEE
BY
Daniel Stryker
ATTORNEY

Nov. 22, 1955     B. D. LEE     2,724,453
METHODS OF IDENTIFYING SEISMIC WAVES
Filed May 4, 1951     5 Sheets-Sheet 2

FIG. 3

INVENTOR.
BURTON D. LEE
BY
Daniel Stryker
ATTORNEY

Nov. 22, 1955 B. D. LEE 2,724,453
METHODS OF IDENTIFYING SEISMIC WAVES
Filed May 4, 1951 5 Sheets-Sheet 4

INVENTOR.
BURTON D. LEE
BY
Daniel Stryker
ATTORNEY

FIG. 9.

United States Patent Office 2,724,453
Patented Nov. 22, 1955

2,724,453

METHODS OF IDENTIFYING SEISMIC WAVES

Burton D. Lee, Houston, Tex., assignor to The Texas Company, New York, N. Y., a corporation of Delaware Application May 4, 1951, Serial No. 224,511

7 Claims. (Cl. 181—.5)

This invention is concerned with seismic prospecting and provides novel methods for determining whether a given seismic wave picked up during prospecting is a reflection from a continuous reflecting surface or a diffraction from a fault.

This application is a continuation-in-part of my co-pending application Serial No. 744,091, filed April 26, 1947 and now abandoned.

Seismic prospecting involves the detection of artificially produced seismic or acoustic waves in the earth. Study of wave propagation through the portion of the earth under survey often permits the determination of the depth and shape of sub-surface formations and these determinations are useful in the search for and development of oil fields, mineral deposits, underground water, and the like.

In reflection seismic prospecting, a seismic disturbance is created at or near the earth's surface by explosion or by pounding. The pattern of the resulting elastic or acoustic waves is detected at a plurality of spaced points in the neighborhood, following the reflection of the waves from underlying rock formations. Usually the reflected waves are picked up at the spaced points on or near the surface of the earth with "pick-ups" or geophones and recorded as traces against time side by side on a single record. From the records thus obtained the depth and shape of the surface from which the reflections come may be calculated. Frequently, however, exploration by drilling and the like reveals that the picture of the underground obtained in the seismic survey is wrong and that underground structural traps indicated by the seismograph as possible reservoirs for petroleum do not exist at all. This may be because diffracted waves from faults have been mistaken for reflected waves from bedding planes.

I have developed methods for determining with certainty whether a particular wave pattern encountered in seismic prospecting is a reflection from a continuous reflecting surface (such as a contact or interface between two beds in which the seismic wave has different velocities) or a diffraction from a broken edge of a bedding plane resulting from faulting.

"Diffraction" as used herein, means the scattering of seismic energy which occurs at a discontinuity in the earth's crust. In other words, the term is employed in the same manner as employed in the Huygen's principle. Reflected waves appear to originate from the images of the shot point in the reflecting beds, while diffracted waves seem to originate at the discontinuity, i. e. the broken edge of the bed, but are delayed by the time necessary for a wave to travel from shot point to discontinuity. The stepout time of a reflection therefore depends upon the geometrical relationship between shot point, image and detector positions and hence on the geometrical relationship between the shot point and the detector positions. On the contrary, the stepout time of diffracted waves depends upon a different geometrical relationship.

In general, my invention may be described as a method for determining whether a suspect wave is a reflection from a continuous surface or a diffraction from a fault which comprises producing the suspect wave in the earth, determining the actual arrival times of the wave thus produced at a plurality of spaced pickup points in the earth, computing one set of expected arrival times for the wave at the respective pickup points on the assumption that the wave is reflected from the reflecting surface, computing another set of arrival times for the wave at the respective pickup points on the assumption that the wave is diffracted from the fault, comparing the actual arrival times with the two sets of computed arrival times and determining which set of computed arrival times more nearly corresponds to the set of actual arrival times. If the first set of computed arrival times more nearly corresponds to the actual set of arrival times the suspect wave is a reflection and is indicative of a reflecting interface such as a bedding plane. If the second set of computed arrival times more nearly corresponds to the set of actual arrival times the suspect wave is a diffraction from a broken or faulted end of a bedding plane and indicates the presence of a fault.

To consider the broader aspect of the invention in somewhat greater detail, the nature of a suspect wave, i. e. whether it is a reflection from a bed or a diffraction from a broken edge of a bed, preferably is determined as follows:

1. A first seismic wave is initiated at a shot point in a seismic setup (i. e. a spatial arrangement of shot point and a spread of spaced detector points).

2. The arrival times of this first seismic wave at the detector points of the setup are measured.

3. From the arrival times and the spatial arrangement of the setup, there are determined (a) the dip, strike and depth (position in space) of a bed which would produce such arrival times if the wave were a reflection; and (b) the attitude and depth (position in space) of a broken edge (line) which would produce such arrival times if the wave were a diffraction.

4. The setup is changed, by moving the shot point or one or more detector points, or both shot point and detector points, to give a component of movement normal to the strike of the suspect wave.

5. A second seismic wave is initiated at the shot point of the second setup.

6. The actual arrival times of this second wave are determined for a plurality of detector points in the second setup.

7. The expected arrival times of the second seismic wave at the detector points of the changed or second setup are computed (a) on the assumption that the second seismic wave is reflected from the bed whose position in space was determined in step 3(a); (b) on the assumption that the second seismic wave is reflected from the broken edge whose position in space was determined in step 3(b).

8. The set of actual arrival times for the second setup is compared with the two sets of computed arrival times for the second setup to determine whether actual arrival times correspond to the "reflection" assumption or the "diffraction" assumption.

In computing arrival times on the two assumptions (reflection and diffraction) outlined above, it is convenient to know the strike of the suspect wave. A method for determining this strike is set forth in detail in co-pending application Serial No. 515,486, filed December 24, 1943, by Alexander Wolf (now Patent No. 2,449,921), and consists essentially of setting up a line of detectors at various azimuth angles and determining the azimuth of greatest apparent dip. The direction at right angles to the latter azimuth is the strike of the suspect wave. Thus the term "strike" of a seismic wave is defined for purposes of this invention as that line along which detectors equally spaced on opposite sides of a shot point will record equal arrival times when corrected for weathering and elevation differences. In another view, the strike and dip of a wave are respectively the strike and dip of a plane tangent to the wave front at the point of observation (i. e. the detector point).

In a preferred practice of my invention to determine whether a suspect wave is a reflection from a continuous surface or a diffraction from a fault, the strike of the suspect wave is determined, a first seismic disturbance is created at a first shot point and the actual arrival times of the resulting first wave are measured at a plurality of spaced pickup points in the earth. A second seismic disturbance is created at a second shot point which is located substantially to one side of a horizontal line drawn through the first shot point parallel to the strike of the suspect wave, i. e. so as to provide a component of movement of the shot point normal to the strike of the suspect wave. The actual arrival times of the resulting second wave at the pickup points are measured. The expected arrival times at the several pickup points for the first wave and the second wave are computed on the assumption that the waves are reflected from the reflecting surface, and the expected arrival times at the several pickup points for the first wave and the second wave are also computed on the assumption that the waves are diffracted from the fault. The computed arrival times are then compared with the actual arrival times, thereby determining whether the picked up waves actually are diffractions representative of a fault or reflections representative of a continuous interface such as a bedding plane.

As disclosed in the aforementioned application of which this is a continuation-in-part, I have developed a special procedure in which the locations of detector points and shot points are so chosen that the stepout time of the wave will remain constant as the shot point is changed, if the wave is a diffraction, but will change if it is a reflection. In this way, it is possible to distinguish between reflections and diffractions and consequently between bedding planes and faults without any calculation at all. In this special procedure for distinguishing between reflections from a bedding plane and diffractions from a fault, the strike of the suspect wave is determined, for example, as described above. A plurality of vibration detectors or pickups are placed along a line approximately normal to the strike; a seismic disturbance is created at a shot point in the neighborhood of the detectors and the stepout times of the resulting wave are determined at the several detectors. Thereafter a second seismic disturbance is created at a second shot point disposed on a line passing through the first shot point and substantially parallel to the line of the detectors. The stepout times of the resulting second wave from the second seismic disturbance are determined at the several unmoved detectors and the difference in the stepout times of the two waves is determined. Under the conditions outlined above, a diffracted wave will maintain a constant stepout time (i. e. the difference in time of arrival of the wave at successive detectors, hereinafter called $\Delta T$) without regard to shot point location as long as the shot point is not placed so as to permit reflection from the bed itself. On the contrary, reflected waves will exhibit the changes in stepout time which are determined by the geometry of the "spread," i. e. the disposition of shot points and pickups. In short, if the stepout time remains constant as shot point location is changed under these special conditions, the wave is a diffracted one from the broken edge of a bedding plane and indicates a fault. If the stepout time changes as the shot point location is changed the waves are reflections from a continuous interface and represent a bedding plane.

It is not necessary that the strike of the suspect wave be determined with accuracy either in the special case which involves no calculation or in the general case where computations are made on the assumption that the wave is reflected. Errors of plus or minus 10° are quite tolerable. In the special case, the diffracted wave may appear to exhibit slight changes in stepout time when the strike is not absolutely established, but these changes will be small compared to the changes in stepout time obtained from reflections having comparable arrival times and will leave no doubt whether one is dealing with reflections or diffractions, provided the movement of the shot point between shots has been great enough to produce an easily detectable change in stepout time if the wave were a true reflection.

The expected change in stepout time of a reflection for a given movement of the shot point, detector positions remaining unchanged, is readily calculated from the general equation for slope. If the smallest time difference measurable on the record is 0.001 second it is not good practice to move the shot point a distance less than that required to produce a change in stepout time of the wave less than several times 0.001 second. In other words, the shot point should be moved a distance sufficient to cause a change in stepout time which is 0.004 to 0.005 second if the wave in question is a reflection. In other words, whether the special case or the general case be considered, there must be a sufficient component of the shot point normal to the strike of the suspect wave. In the special case the movement of the shot point is entirely normal to the strike. But in either case, the shot point should be changed by an amount which will produce considerably more change in stepout time of the wave, if it is a reflection, than the normal limit of error of a reading of arrival time of a wave. Again, if the normal limit of error reading is plus or minus 0.001 second the expected change in $\Delta T$ under the assumption of a true reflection should be not less than 0.004 or 0.005 second.

Except in the special case where no calculation is needed, the detectors may be arranged in any manner whatever, the only requirement being that the position of each be known. Probably the most desirable arrangement is one in which the detectors form a cross with an equal number of detectors in each line of the cross. They may also be arranged in a circular arc or even in a complete circle. There is considerable advantage in employing a two dimensional spread rather than a straight line in that it allows direct determination of the strike of a wave without requiring multiple shots. In this way, one shot can yield all the necessary information for determination of the strike of the suspect wave.

Figure 4:
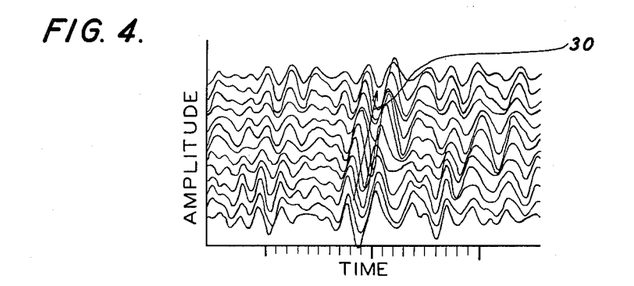
Fig. 4 is a portion of a seismogram showing the appearance of a wave which manifests an anomalous stepout time that may lead one to investigate to see whether a fault is present.

My invention is applicable whether or not there is reason to suspect that faults are present, and if desired, may be used as standard procedure in all prospecting. There are, however, certain clues which, I have found, frequently justify a suspicion that a wave is being diffracted rather than truly reflected. Probably the most readily discernible situation is one in which a wave appears in a record with an anomalous stepout time as compared to both preceding and succeeding events (see Fig. 4). Such a condition should immediately lead one to investigate the conditions controlling the particular case.

If the survey is being conducted with so-called three-dimensional control a characteristic straight line alignment of strike and dip symbols as plotted on the work map will appear with the line through these symbols intersecting the line of survey at an angle and with the magnitude of dips progressively increasing as the plotted positions of the dips move farther and farther away from the survey. This condition, however, will occur only if the line of survey intersects the fault at an angle appreciably different from 90° or 0°. If the line of transverse should be approximately normal to the fault and thus to the strike, all of the dip symbols will tend to stack up on a single spot of the map, which is again indicative of faulting.

If the line should be parallel to the fault, the dip and strike symbols will align themselves parallel to the line and will not necessarily give a clue to the presence of faulting, except that the direction of indicated dip may be in considerable disagreement with the indicated dips of normal bed reflections.

It is also possible to recognize the presence of diffracted energies on the plotted cross section of the region undergoing investigation if the dips are being "migrated," as should normally be done. In this case again, the dips tend to stack up at a particular point if the line is normal to the fault, or show a considerable amount of clustering even though the line may be other than normal to the line. As the line approaches parallelism to the fault this stacking up or clustering becomes less pronounced and again with the line parallel to the fault there is no way of determining whether the wave is diffracted except by calculation in accordance with the invention.

Serious mistakes in interpretation may occur due to failure to recognize the existence of diffracted waves and the determination of the effect of these diffracted waves on the sub-surface picture. One may be following a bed or series of beds from true seismic reflections. On coming into the neighborhood of a fault the reflections may become diffractions without realization of this fact on the part of the interpreter. If he continues to treat the received waves as reflections the interpretation of the sub-surface may be greatly in error. The danger is especially acute where the line of survey crosses the fault at an angle far from normal to the strike. In one instance failure to recognize diffractions in such a situation resulted in mislocation of a fault by a horizontal distance of approximately two miles and the introduction of approximately 1000 feet of relief which did not exist at all in bedding planes. When it was suspected that the waves in question were diffractions a survey was conducted as outlined for the special case, i. e. with a line of pickups disposed approximately normal to the strike of the suspect wave and with the shot point moved entirely normal to the strike. This quickly established the identity of the waves, located the fault, and permitted a proper interpretation of relief of sub-surface bedding planes.

The preferred practice of the invention, involving calculation, may be outlined as follows:

(a) The strike of the suspect wave is determined;

(b) A shot is fired at any convenient location with respect to the detector spread and the resulting vibrations picked up at each detector location are recorded side by side against time in the conventional manner;

(c) A second shot is fired at a convenient location with respect to the detector spread, but in such a position as to produce an adequate component of movement of the shot point normal to the strike of the suspect wave as determined in step (a). In other words, the second shot point is offset from a horizontal line parallel to the strike of the suspect wave and passing through the first shot point. The vibrations from the second shot are recorded as in step (b);

(d) The wave is assumed to be a reflection and from the data available from step (a) the expected arrival time of the first wave is computed for each of the several detector positions. It is then assumed further than the bed producing the "reflection" maintains its indicated attitude and the expected arrival time of the "reflection" is computed for each of the several detector positions for the second shot;

(e) The wave is assumed to be diffracted from the edge of a faulted bed and its expected arrival time at each of the detector positions is computed for the first shot. The step is repeated for the second shot;

(f) The observed arrival times of the suspect wave are then compared with the expected arrival times as computed in step (d) on the assumption of a reflected wave and as computed in step (e) on the assumption of a diffracted wave and in this way it is determined what geometry controls.

As previously indicated, the position of the second shot point with respect to the first should be such as to provide the required adequate component normal to the strike of the suspect wave. Under these conditions, the expected arrival times computed on the assumption of reflections and on the assumption of diffraction conditions will differ considerably and it will be easy to see which corresponds more nearly with actual arrival times.

The preferred procedure in the special case in which the location of the shot points and pickup points are so chosen that computation becomes unnecessary is as follows:

(a) The strike of the suspect wave is determined;

(b) A spread of detectors is placed in a line normal to the direction of the strike as determined in step (a);

(c) A shot point is located at some convenient location either inside or outside of the detector spread but preferably in line with the detectors. A shot is fired and the resulting vibrations are recorded for the several pickup points;

(d) A second shot point is chosen at a distance from the first, this distance being approximately equal to the distance of the spread and measured on a line drawn through the first shot point parallel to the detector spread. This means that the movement of the shot point is normal to the direction of strike as determined in step (a). The second shot is fired and the resulting vibrations picked up at the several detector points is recorded;

(e) The stepout time of the suspect wave as it appears on the two records is compared. If the suspect wave has maintained substantially the same stepout time on the two records, the suspect wave is a diffraction and indicates the presence of a fault. If the stepout time for the two records differs, the wave is a reflection.

It is, of course, necessary that the distance between the two shot points be sufficient to result in an appreciable change in step-out time of the wave in case it is a reflection. This separation will depend upon (1) the length of the spread;
(2) the depth from which the wave appears to originate; and
(3) the average velocities of propagation of the wave.

These and other aspects of my invention will be understood more thoroughly in the light of the following detailed description taken in conjunction with the accompanying drawings in which.

Figure 1:
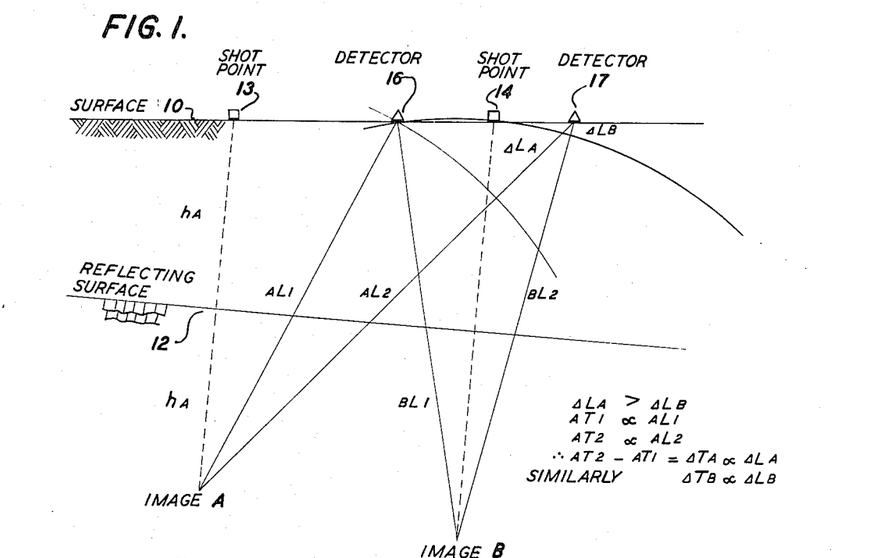
Fig. 1 is a diagram of a vertical geological section showing the effect on seismic waves of a continuous reflecting surface or interface, say a bedding plane, at which there is marked change in seismic velocity.

Referring to Fig. 1, shot points 13, 14 are spaced from each other on the earth's surface 10 with detectors 16, 17 disposed in line with the shot points or on a line parallel to the line passing through the shot points. A continuous reflecting surface 12, say a bedding plane in which marked change in seismic velocity occurs, underlies the shot points and the detectors. A seismic wave originating at the shot point 13 will be reflected from the bedding plane 12, and the reflected wave will be received at both detectors 16, 17. In such case, the reflection will appear to originate at the point of an image A located below the bedding plane on a line perpendicular hereto running through the shot point, the distance $h_A$ from the image A to the reflecting surface being the same as the distance from the reflecting surface to the shot point.

Under these conditions, the length of the radius $AL_1$ joining the image A of the shot point to the detector 16 and the length of the radius $AL_2$ joining the image A of the shot point to the detector 17 depend on the position of the image of the shot point, detector positions remaining fixed. Likewise, the difference between these radii $\Delta L_A$ depends upon the position of the image of the shot point.

Similar relations exist with respect to the shot point 14 and the two detector positions. Reflections from this shot point appear to originate at an image B on a line perpendicular to the reflecting surface drawn through the shot point 14, the image being the same distance below the reflecting surface that the shot point is above. The length of the radius $BL_1$ joining the image B to the detector 16 is less than the radius $BL_2$ joining the image B to the detector by the differential $\Delta L_B$. Thus in Fig. 1, $$AL_2 - AL_1 = \Delta L_A \quad (1)$$

which is much greater than $$BL_2 - BL_1 = \Delta L_B \quad (2)$$

Figure 2:
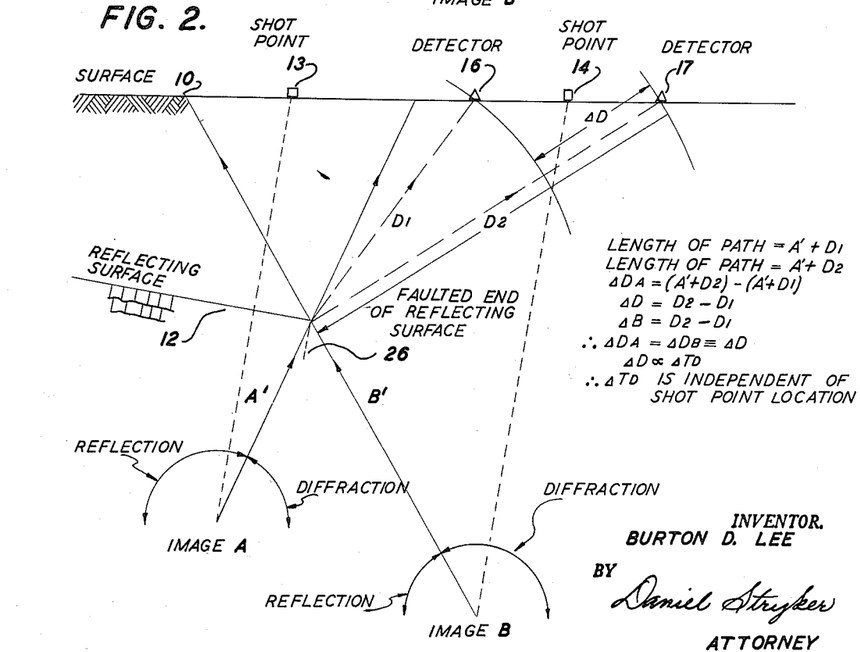
Fig. 2 is a similar sectional elevation showing the effect on seismic waves of a faulted reflecting surface.

Now arrival time $AT_1$ at detector 16 due to reflections of an explosion at the shot point 13 is a function of $AL_1$ and arrival time $AT_2$ at the detector 17 is proportional to $AL_2$. Hence $$AT_2 - AT_1 = \Delta T_A \quad (3)$$

which is a function of $\Delta L_A$. Similarly, $\Delta T_B$ is a function of $\Delta L_B$. It follows that the difference in the times of arrival of a reflection at detectors 16, 17 depends upon the location of the shot point image, and hence upon the location of the shot point itself. This is in marked contrast with the conditions existing with a discontinuous reflection surface as in the case of the faulting illustrated in Fig. 2.

In Fig. 2, the reflecting surface or bedding plane 12 is faulted at a point 26. The strike of the fault is perpendicular to the plane of the paper. Otherwise the geological section is the same with the shot points and detectors located as in the case of Fig. 1 on the surface 10, i. e. normal to the strike of the fault or parallel to its maximum dip. Because of the faulting, in the case illustrated in Fig. 2, reflected waves cannot reach either of the detectors from shots originating at either shot point. But there are certain zones in which reflections can be received. These are illustrated in Fig. 2 as the arcs drawn from the image points A and B and marked "reflection" in each case. Diffracted waves which result from the discontinuity of the reflecting surface can reach either of the two detectors from either shot point, as indicated by the arcs marked "diffraction" at the images of the two shot points.

Under the excitation from a shot, the discontinuity of the reflecting surface behaves as a new energy source so that the diffracted waves appear to originate at the point 26 of discontinuity. Therefore, as far as diffracted waves are concerned, the shot point images of Fig. 2 are images in the discontinuity of the reflecting surface rather than in the reflecting surface itself. By way of illustration, the length of path for energy from the image A of shot point 13 to detector 16 in Fig. 2 is $A' + D_1$, i. e. the sum of the distance from the image A to the faulted end of the reflecting surface plus the distance from the faulted end of the reflecting surface to the detector 16. Similarly, the energy path from the image A of the shot point 13 to the detector 17 is $A' + D_2$. Under these conditions $$(A' + D_2) - (A' + D_1)$$

is the difference in the lengths of the two energy paths $\Delta D_A$. But $$\Delta D_A = A' + D_2 - A' - D_1 = D_2 - D_1 \quad (4)$$

The paths for energy from the image B of the shot point 14 to the detector 16 is $B' + D_1$, where $B'$ is the distance from the image B to the point 26 of discontinuity, and $D_1$ is again the distance from the point 26 to the detector 16. Similarly, the path for energy from the image B of the shot point 14 to the detector 17 is equal to $B' + D_2$. Then $\Delta D_B$, i. e. the difference between the two energy paths from the image of shot point B to the two detectors, is $$\Delta D_B = B' + D_2 - B' - D_1 = D_2 - D_1 \quad (5)$$

From the foregoing it is evident that $$\Delta D_A = \Delta D_B \quad (6)$$

and that this difference is independent of shot point location under the conditions of Fig. 2. As shown above, $\Delta D$ is a function of $\Delta T$. Hence the difference in arrival time $\Delta TD$ of a diffracted wave under the conditions illustrated in Fig. 2 is independent of shot point location, while, as already illustrated, the difference in arrival time of a reflected wave TR depends, among other things, on shot point location.

Practical application of the method of the invention can also be illustrated with reference to Fig. 2. When a fault is suspected, for example, from the appearance of anomalous or steeply dipping "reflections" that seem to indicate a rapid change in dip of a bedding plane, the line of maximum apparent dip of the suspect wave is determined, for example, by the method described in the aforementioned application, and a plurality of detectors is placed along this line. Then a shot is fired from a shot point located on the same line or on a convenient parallel line, and the resulting vibrations at the detectors are recorded simultaneously and side by side. Thus in Fig. 2 the plane of the paper may be considered as passing through the line of maximum apparent dip with the shot points 13, 14 and the detectors 16, 17 located on this line. Thereafter, the detectors are left in their original positions and the second shot is fired, for example, at the point 14. A second record is obtained from the detectors and a comparison of the $\Delta T$'s of the wave in question on the two records will determine whether the wave is a reflection or a diffraction. Thus if the $\Delta T$'s of the wave are the same in both cases, the wave is due to diffraction. If the $\Delta T$'s are different, the wave is due to reflection. If the wave is due to reflection it indicates a dip in a continuous reflecting surface, if due to diffraction, it indicates a fault in the reflecting surface.

Figure 3:
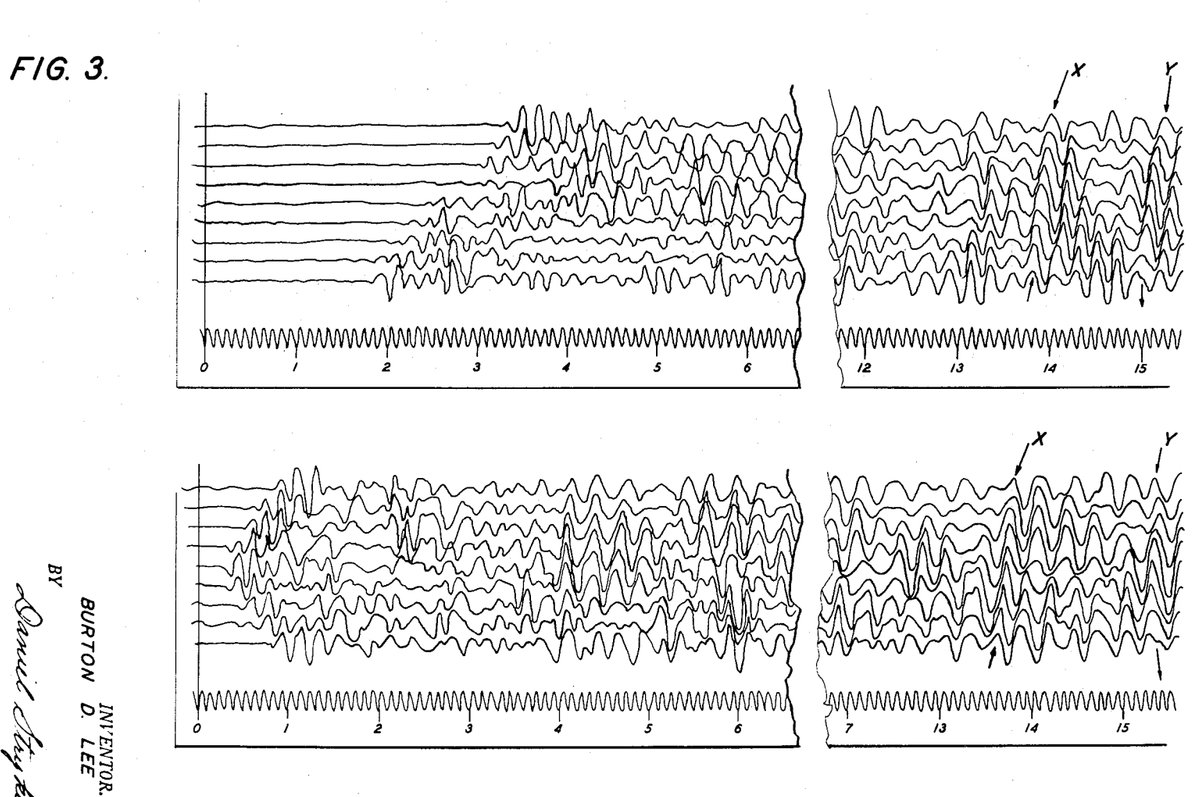
Fig. 3 shows a pair of seismograms obtained by and illustrating the special practice of the invention involving no calculation.

Fig. 3 is a record of the practice just described, except that nine detectors were employed with two different shot points. The upper record was obtained with the detectors which produced the several traces disposed along a line of maximum apparent dip of a suspect wave originating at one point. The lower record was obtained with the detectors in the same positions but with a shot at another point on the line passing through the first shot point and parallel to the line of detectors.

It will be apparent that the wave marked X in both records, although not having the same arrival time in both cases, does have the same stepout time. Thus the wave X in the upper record (Fig. 3) exhibits an arrival time of approximately 1.39 seconds while the wave X in the lower record exhibits an arrival time of approximately 1.37 seconds. This difference in arrival time is expected and will vary with a change in shot point location according to the geometry of the system (Fig. 2). However, it is also apparent from the two records of Fig. 3 that the stepout time of the wave X has not changed; i. e. the apparent angle at which it crosses the record in both cases is the same. This property of the wave X may be compared for example with the wave marked Y on both records. The slope of the wave Y is in the top record from right to left when it is followed from top to bottom. Conversely, in the lower record, the image Y exhibits a slope from left to right when it is traced from top to bottom. Thus the stepout time of the wave Y has clearly changed. This difference in the relationship of stepout time and shot point location as exhibited by the two waves X and Y indicates for the reasons hereinbefore set forth that the wave X is a diffraction and not a reflected wave.

Reference has already been made to signs which may lead the operator to suspect the presence of a fault and then employ the method of the invention to determine whether or not it is really present. One of these signs is apparent in Fig. 4, which is a seismogram with several traces, each representing a plot of vibration amplitude against time. It will be observed that to the right of this record the various corresponding nodes are more or less vertically arrayed and that this is true of the traces at the left also. However, near the center of the record, the alignment of corresponding nodes is on a slant, indicated by the arrow 30. This anomaly will lead an operator to a suspicion that a fault exists and to the application of the method of the invention.

The practice of the invention without employing a special setup and spread location so as to avoid calculation is illustrated in Figs. 5 to 9 inclusive.

Figure 5:
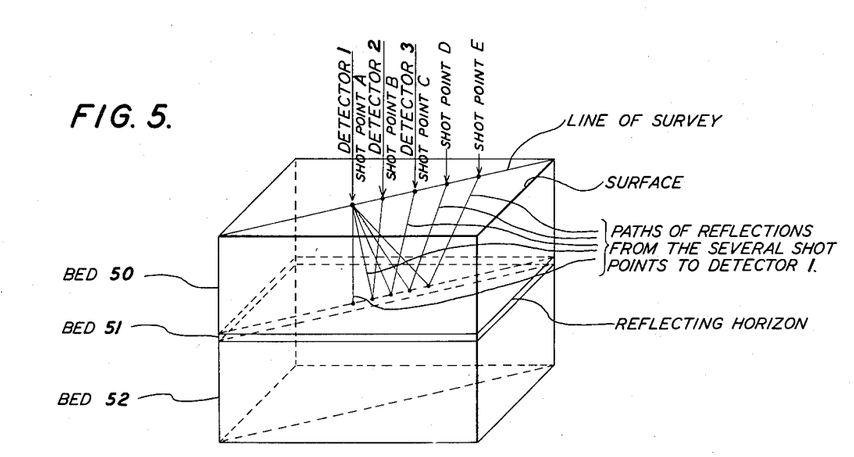
Fig. 5 is a pictorial diagram showing wave travel in three dimensions with level bedding planes causing reflection and without faulting.

Fig. 5 is a diagram of a block of the earth's crust composed of flat-lying beds 50, 51, 52. The interface between beds 50, 51 is the principal reflecting horizon. A survey line is run diagonally across the block and five shot points A, B, C, D, E, are spaced along it at equal distances. The first three shot points are also detector locations. The paths of five reflected waves originating respectively at the five shot points and picked up at detector 1 adjacent shot point A are shown.

Figure 6:
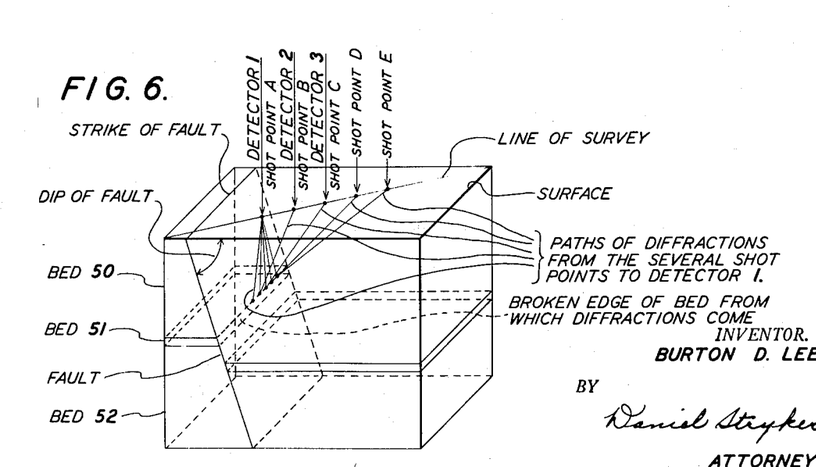
Fig. 6 is a pictorial diagram similar to that of Fig. 5, but with a fault in the bedding planes which causes diffraction.

Fig. 6 is a diagram similar to that of Fig. 5 except that the block is faulted. The broken upper edge of the bed 51 acts as a line from which diffraction occurs. The paths of five diffracted waves originating respectively at the five shot points and picked up at detector 1 adjacent shot point A are show. All are diffracted from different points along the line representing the broken edge of the bed.

Figure 7:
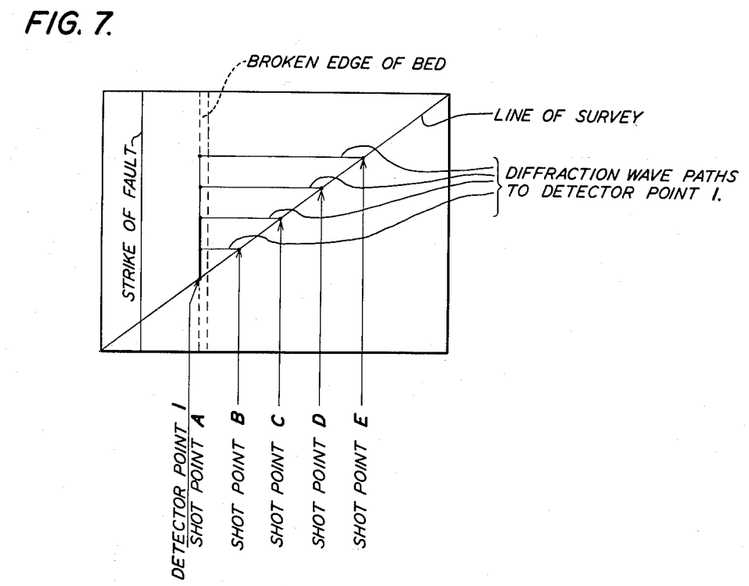
Fig. 7 is a plan view of the earth block shown in Fig. 6, showing projections of diffracted wave paths from the five shot points to a detector point lying directly above the diffracting edge of the bed.

Fig. 7 is a plan view of Fig. 6 and shows projections of its wave paths. The wave path from shotpoint A to detector point 1 is vertical, since both points lie directly over the broken edge of the bed. The other shot points, however, are not over the broken edge, so the wave passes to the broken edge and is diffracted (at right angles as viewed in the projection of Fig. 7) to the detector.

Figure 8:
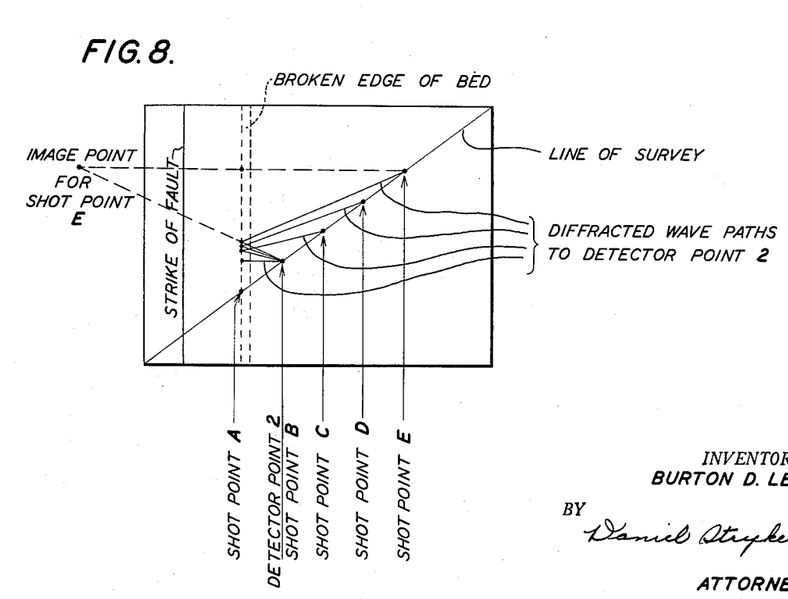
Fig. 8 is a plan view like that of Fig. 7, but showing projections of diffracted wave paths from the five shot points to a detector point offset from that of Fig. 7 in a direction normal to the strike of the fault.

Fig. 8 is like Fig. 7 except that the detector point 2 is adjacent shotpoint B and not directly over the broken edge. The five diffracted wave paths thus become different. The projection of each may be constructed by drawing a line through each shot point normal to the fault, and marking off a distance on the far side of the broken edge equal to the distance from shot point to the broken edge. This establishes an image point. A line is drawn from the image point to detector point 2. The projection of the wave path is then drawn as a straight line from shot point to the point where the line from the image point to the detector point intersects the line of the broken edge, and thence to the detector point. The construction for only one case (shot point E) is shown in Fig. 8.

In the operation illustrated by Figs. 5 to 9, three detectors are placed along the line of the survey adjacent the shot points A, B and C. (In actual practice, more detectors may be employed but the principle is the same). A first seismic wave is then originated by a blast at any one of the shot points, say E, and the arrival times of this wave at the three detectors is measured. Calculations are then made to determine the position in space of a plane that would so reflect the wave as to produce the arrival times actually observed. Calculations are also made to determine the position in space of a line that would so diffract the wave as to produce the actual arrival times. The geometry of the setup with respect to the postulated plane or line and a known or closely assumed velocity of the wave in the earth are the basic data for these calculations.

Figure 9:
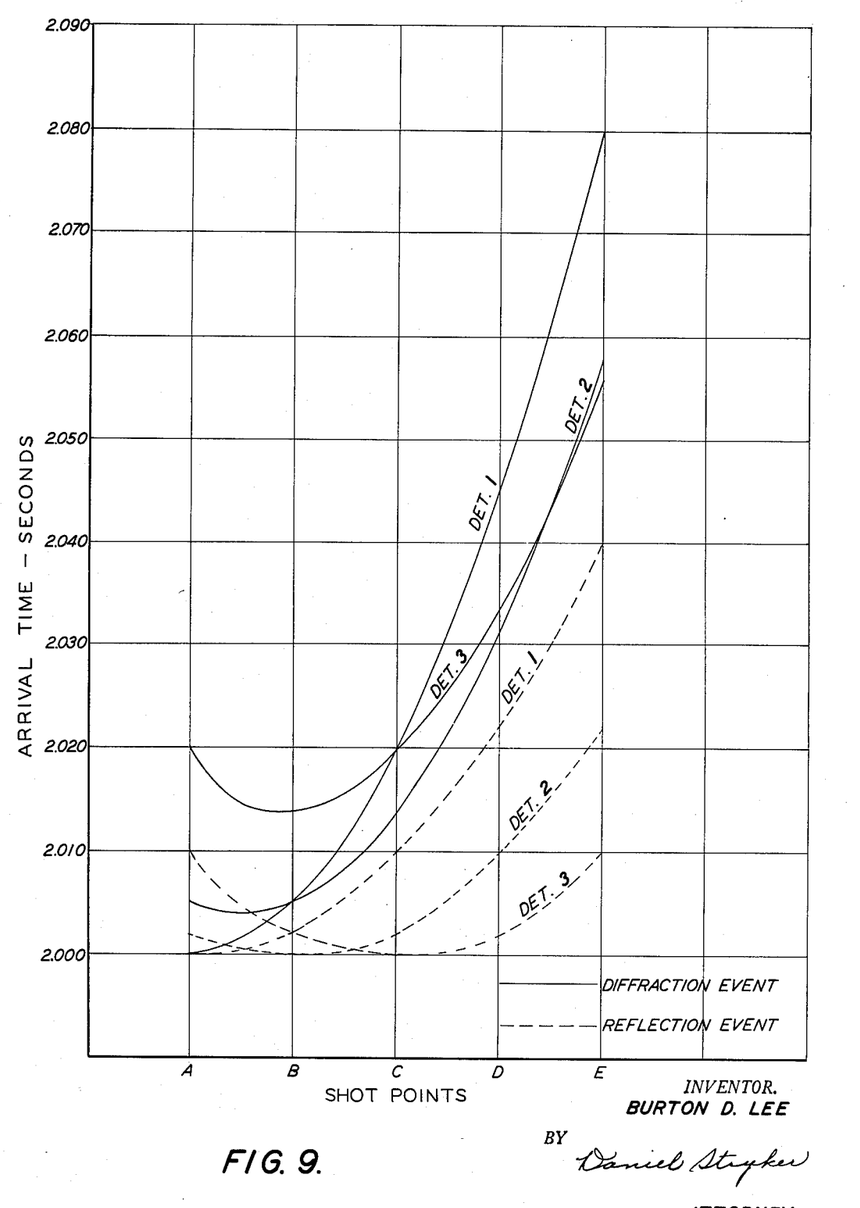
Fig. 9 is a graph of expected arrival times at three different detector positions for five different shot points, calculated respectively on the assumption of diffraction and reflection and illustrating how to determine whether or not the fault postulated in Figs. 6, 7 and 8 is actually present.

Once the positions of the postulated plane and line with respect to the shot points and detector points of the setup illustrated in Figs. 5 and 6 have been determined it is possible to locate all of the points of the curves on Fig. 9. This is done, by calculating what the arrival times at each detector point 1, 2 and 3 for shots fired respectively at shot points A, B, C and D, for the two cases, i. e. reflection and diffraction. In this way a diffraction curve and a reflection curve may be plotted for each detector.

The curves thus developed by computation are compared with the reality. Arrival times for each detector position for shots actually fired one after another at the shot points are determined. These may then be plotted on Fig. 9. If the actual curves (not shown) fall nearest the dotted curves the waves are reflections. If the actual curves fall nearer the solid curves the waves are diffractions.

I claim:

1. In seismic prospecting, the method of ascertaining whether or not a suspect wave is a diffracted wave caused by a suspected fault, which comprises initiating a seismic wave from a shot point so as to create the suspect wave, recording the arrival times of the resulting suspect wave at a plurality of spaced detectors located in the vicinity of the suspected fault and along the path of the suspect wave, establishing the strike of the suspect wave, changing the spatial relationship of the shot point and the detectors to provide a component of movement normal to the strike of the suspect wave with the component of movement being at least twice that required to produce a measurable change in stepout of the expected arrival times of the suspect wave based upon the assumption that the wave is a reflection, initiating a second seismic wave at the shot point of the changed setup so as to create a second suspect wave, recording the arrival times of the second suspect wave at the detectors, and providing a comparison between the arrival times of the second suspect wave at the respective detectors and the expected arrival times of the second suspect wave based upon the previously recorded arrival times of the first suspect wave.

2. In seismic prospecting, the method of ascertaining whether or not a suspect wave is a diffracted wave caused by a suspected fault, which comprises initiating a seismic wave from a shot point so as to create the suspect wave, recording the arrival times of the resulting suspect wave at a plurality of spaced detectors located in the vicinity of the suspected fault and along the path of the suspect wave, changing the spatial relationship of the shot point with respect to the detectors to provide a component of movement of either the shot point or the detectors normal to the strike of the suspect wave with the component of movement being several times that required to produce a measurable change in stepout of the expected arrival times of the suspect wave based upon the assumption that the wave is a reflection, initiating a second seismic wave at the shot point of the changed setup so as to create a second suspect wave, recording the arrival times of the second suspect wave at the detectors, and providing a display of the arrival times of the second suspect wave at the respective detectors and the expected arrival times of the second suspect wave based upon the previously recorded arrival times of the first suspect wave, so that the actual and expected arrival times may be compared.

3. In seismic prospecting, the method of ascertaining whether or not a suspect wave is a diffracted wave caused by a suspected fault, which comprises initiating a seismic wave from a shot point so as to create the suspect wave, recording the arrival times of the resulting suspect wave at a plurality of spaced detectors located in the vicinity of the suspected fault and along the path of the suspect wave, changing the spatial relationship between the shot point and the detectors to provide a component of movement normal to the strike of the suspect wave, initiating a second seismic wave at the shot point of the changed setup so as to create a second suspect wave, recording the arrival times of the second suspect wave at the detectors, and providing a comparison between the arrival times of the second suspect wave at the respective detectors and the expected arrival times of the second suspect wave based upon the previously recorded arrival times of the first suspect wave and the assumption that the wave is a reflection and the assumption that the wave is a diffraction.

4. In seismic prospecting, the method of ascertaining whether or not a suspect wave is a diffracted wave caused by a suspected fault, which comprises initiating a seismic wave from a shot point so as to create the suspect wave, recording the arrival times of the resulting suspect wave at a plurality of spaced detectors located in the vicinity of the suspected fault and along the path of the suspect wave, establishing the strike of the suspect wave, changing the spatial relationship between the shot point and the detectors to provide a component of movement normal to the strike of the suspect wave with the component of movement being several times greater than that required to produce a measurable change in stepout of the arrival times of the suspect wave based upon the assumption that the wave is a reflection, initiating a second seismic wave at the shot point of the changed setup so as to create a second suspect wave, recording the arrival times of the second suspect wave at the detectors, computing the expected arrival times of the second suspect wave at the detectors of the changed setup on the assumption that the second wave is a reflection and also on the assumption that the second wave is a diffraction, and providing a record of the computed arrival times along with the actual arrival times so that the times can be compared to ascertain which set of the computed times more nearly corresponds to the actual arrival times.

5. In seismic prospecting, the method of ascertaining whether or not a suspect wave is a diffracted wave caused by a fault, which comprises initiating a seismic wave from a first shot point so as to create the suspect wave, recording the arrival times of the resulting suspect wave at a plurality of spaced detectors located in the vicinity of the suspected fault and along the path of the suspect wave, establishing the strike of the suspect wave, initiating a second seismic wave from a second shot point which is offset from a line which is parallel to the strike of the suspect wave and which passes through the first shot point so as to create a second suspect wave, the offset of the second shot point being at least twice the distance required to produce a measurable change in stepout of the expected arrival times of the second suspect wave, based upon the assumption that wave is a reflection, recording the arrival times of the second suspect wave at the respective unmoved detectors, and providing a comparison between the arrival times of the second suspect wave at the respective detectors and the expected arrival times of the second suspect wave based upon the previously recorded arrival times of the first suspect wave.

6. In seismic prospecting, the method of ascertaining whether or not a suspect wave is a diffracted wave caused by a suspected fault, which comprises establishing the strike of the suspect wave, placing a plurality of vibration detectors along a line located in the vicinity of the suspected fault and disposed approximately normal with respect to the strike of the suspect wave, creating a seismic disturbance at a first shot point, recording the arrival times of the resulting suspect wave at the respective detectors, creating a second seismic disturbance at a second shot point on a line passing through the first shot point and approximately parallel to the line of detectors, the second shot point being spaced from the first shot point at least twice the distance required to produce a measurable change in stepout of the expected arrival times of the second suspect wave, and recording the arrival times of the resulting second suspect wave from the second seismic disturbance at the respective unmoved detectors, so that the arrival times of the two waves at the respective detectors may be compared to show whether the arrival times have substantially the same stepout indicating a diffraction wave or have different stepouts indicating a reflection wave.

7. In seismic prospecting, the method of ascertaining whether a suspect wave is a diffracted wave caused by a suspected fault, which comprises establishing the strike of the suspect wave, placing a plurality of vibration detectors along a line located in the vicinity of the suspected fault and disposed approximately normal with respect to the strike of the suspect wave, creating a seismic disturbance at a first shot point, recording the arrival times of the resulting suspect wave at the respective detectors, creating a second seismic disturbance at a second shot point on a line passing through the first shot point and approximately parallel to the line of detectors, and recording the arrival times of the resulting second suspect wave from the second seismic disturbance at the respective unmoved detectors, so that the arrival times of the two waves at the respective detectors may be compared to show whether the arrival times have substantially the same stepout indicating a diffraction wave or have different stepouts indicating a reflection wave.

References Cited in the file of this patent

UNITED STATES PATENTS

| Re. 21,183 | Blau | Aug. 29, 1939 |
| 2,449,921 | Wolf | Sept. 21, 1948 |